(12) United States Patent
Takashima et al.

(10) Patent No.: US 11,850,821 B2
(45) Date of Patent: Dec. 26, 2023

(54) HOT-PRESSED MEMBER, COLD-ROLLED STEEL SHEET FOR HOT-PRESSED MEMBER, AND METHOD FOR PRODUCING THE SAME

(71) Applicant: JFE Steel Corporation, Tokyo (JP)

(72) Inventors: Katsutoshi Takashima, Tokyo (JP); Minoru Tanaka, Tokyo (JP); Kenji Tsuzumi, Tokyo (JP); Shingo Arakawa, Tokyo (JP); Michitaka Sakurai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 180 days.

(21) Appl. No.: 17/425,847

(22) PCT Filed: Dec. 26, 2019

(86) PCT No.: PCT/JP2019/051231
§ 371 (c)(1),
(2) Date: Jul. 26, 2021

(87) PCT Pub. No.: WO2020/158285
PCT Pub. Date: Aug. 6, 2020

(65) Prior Publication Data
US 2022/0118741 A1    Apr. 21, 2022

(30) Foreign Application Priority Data
Jan. 31, 2019    (JP) ................. 2019-015062

(51) Int. Cl.
| | | |
|---|---|---|
| *C21D 6/00* | (2006.01) |
| *B32B 15/01* | (2006.01) |
| *B21B 3/02* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/16* | (2006.01) |
| *C22C 38/26* | (2006.01) |
| *C22C 38/28* | (2006.01) |
| *C22C 38/32* | (2006.01) |
| *C23C 2/02* | (2006.01) |
| *C23C 2/26* | (2006.01) |
| *C23C 2/28* | (2006.01) |
| *C25D 3/22* | (2006.01) |

(52) U.S. Cl.
CPC .............. *B32B 15/015* (2013.01); *B21B 3/02* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/16* (2013.01); *C22C 38/26* (2013.01); *C22C 38/28* (2013.01); *C22C 38/32* (2013.01); *C23C 2/02* (2013.01); *C23C 2/024* (2022.08); *C23C 2/0224* (2022.08); *C23C 2/26* (2013.01); *C23C 2/28* (2013.01); *C21D 2211/008* (2013.01); *C25D 3/22* (2013.01)

(58) Field of Classification Search
None
See application file for complete search history.

(56) References Cited

U.S. PATENT DOCUMENTS

| | | | |
|---|---|---|---|
| 8,628,630 B2 | 1/2014 | Kobayashi et al. | |
| 2015/0225821 A1* | 8/2015 | Hikida | .............. C22C 38/20 |
| | | | 420/104 |
| 2016/0208355 A1* | 7/2016 | Nakagaito | .............. C22C 38/00 |
| 2017/0096724 A1* | 4/2017 | Hikida | .............. B22D 11/001 |
| 2017/0225215 A1* | 8/2017 | Nakagaito | .............. C23C 2/02 |
| 2020/0172991 A1 | 6/2020 | Takashima et al. | |

(Continued)

FOREIGN PATENT DOCUMENTS

| | | |
|---|---|---|
| EP | 3647445 A1 | 5/2020 |
| JP | 2011063877 A | 3/2011 |

(Continued)

OTHER PUBLICATIONS

Chinese Office Action with Search Report for Chinese Application No. 201980090744.8, dated May 13, 2022, 13 pages.

(Continued)

*Primary Examiner* — Humera N. Sheikh
*Assistant Examiner* — Kim S. Horger
(74) *Attorney, Agent, or Firm* — RATNERPRESTIA

(57) ABSTRACT

A hot-pressed member has a predetermined chemical composition. In the hot-pressed member, a steel sheet has a microstructure in which a prior austenite average grain diameter is 8 μm or less, and martensite is present in a volume fraction of 95% or greater in a region within 30 μm of a surface; a Ni diffusion region having a thickness of 0.5 μm or greater exists in a surface layer; a standard deviation of Vickers hardness values is 35 or less; Mndif (mass %) in a sheet thickness direction ≤0.20, where Mndif (mass %) is a degree of Mn segregation; and a tensile strength is 1780 MPa or greater.

4 Claims, No Drawings

(56) References Cited

U.S. PATENT DOCUMENTS

2020/0353527 A1 11/2020 Takashima et al.
2020/0354806 A1 11/2020 Takashima et al.

FOREIGN PATENT DOCUMENTS

| JP | 2012157900 A | 8/2012 | |
|---|---|---|---|
| JP | 2013227614 A | 11/2013 | |
| WO | 2019003538 A1 | 1/2019 | |
| WO | 2019003539 A1 | 1/2019 | |
| WO | 2019003540 A1 | 1/2019 | |
| WO | 2019003543 A1 | 1/2019 | |
| WO | WO-2019003538 A1 * | 1/2019 | ............. B21D 22/20 |
| WO | WO-2019003540 A1 * | 1/2019 | ........... B21D 22/022 |

OTHER PUBLICATIONS

Chinese Office Action for Chinese Application No. 201980090744.8 dated Nov. 23, 2022 with Concise Statement of Relevance of Office Action, 8 pages.
International Search Report and Written Opinion for International Application No. PCT/JP2019/051231, dated Mar. 24, 2020, 5 pages.
Korean Office Action for Korean Application No. 10-2021-7023601, dated Mar. 20, 2023 with Concise Statement of Relevance of Office Action, 8 pages.
Extended European Search Report for European Application No. 19 912 661.6, dated Feb. 14, 2022, 10 pages.

* cited by examiner

HOT-PRESSED MEMBER, COLD-ROLLED STEEL SHEET FOR HOT-PRESSED MEMBER, AND METHOD FOR PRODUCING THE SAME

CROSS REFERENCE TO RELATED APPLICATIONS

This is the U.S. National Phase application of PCT/JP2019/051231, filed Dec. 26, 2019 which claims priority to Japanese Patent Application No. 2019-015062, filed Jan. 31, 2019, the disclosures of these applications being incorporated herein by reference in their entireties for all purposes.

FIELD OF THE INVENTION

The present invention relates to a hot-pressed member for use in the automotive field and to a method for producing the hot-pressed member, and the present invention also relates to a cold-rolled steel sheet for a hot-pressed member and to a method for producing the cold-rolled steel sheet. In particular, aspects of the present invention seek to improve delayed fracture resistance that can be exhibited by a hot-pressed member after projection welding.

BACKGROUND OF THE INVENTION

In recent years, the increase in awareness of environmental issues has led to increasingly strict regulation of $CO_2$ emission, and, therefore, in the automotive field, reducing the weight of vehicle bodies to improve fuel efficiency has been a challenge. To address this, attempts to reduce a thickness of automotive parts by using a high-strength steel sheet are being made, and, accordingly, using a steel sheet having a tensile strength (TS) of 1780 MPa or greater is being considered. While high-strength steel sheets that are used in an automotive structural member or reinforcing member are required to have excellent formability, steel sheets of 1780 MPa or greater have low ductility and, therefore, during cold press forming, exhibit cracking and/or significant spring back due to a high yield strength; as a result, high dimensional accuracy is not exhibited after the cold press forming. Another concern is that since residual stress remains in the steel sheet after cold press forming, hydrogen absorbed from a usage environment may cause delayed fracture (hydrogen embrittlement).

Under these circumstances, one approach for achieving high strength that has been attracting attention recently is the use of hot pressing (also referred to as hot stamping, die quenching, press quenching, or the like) for forming. Hot pressing is a forming method in which a steel sheet is heated to an austenite-single-phase temperature range, and subsequently, with the high temperature being maintained, the steel sheet is subjected to forming (processing), by which forming can be accomplished with high dimensional accuracy; and after the forming, quenching is carried out by performing cooling, by which strength can be increased. Furthermore, in hot pressing, residual stress that remains after the press forming is low compared with cold pressing, and, therefore, delayed fracture resistance is improved.

In many steps for assembling a motor vehicle, assembling is carried out by using resistance spot welding; however, in some locations into which a resistance spot welding gun cannot be placed, assembling is carried out by tightening a bolt. Furthermore, in many instances where a dissimilar material (e.g., aluminum or a plastic) is to be joined, the joining is carried out by tightening a bolt. In these instances, a nut having a projection is resistance-welded to a steel sheet, and thereafter, another sheet is assembled thereto with a bolt. Although hot-pressed members have low residual stress as stated above, a stress still exists after hot pressing for maintaining the rigidity of the entire motor vehicle body, and, therefore, there is a concern that delayed fracture may occur in the portion of the steel sheet to which the nut has been welded.

PATENT LITERATURE

PTL 1: Japanese Unexamined Patent Application Publication No. 2012-157900

SUMMARY OF THE INVENTION

The related art discloses means for improving peel strength that can be exhibited after projection welding of a nut, and examples of the means include a technology for improving peel strength by controlling welding conditions as described in Patent Literature 1. However, no technology has been developed for improving post-hot-pressing delayed fracture resistance of a portion to which a nut has been projection-welded.

Thus, it has been believed that improving, without relying on welding conditions, the delayed fracture resistance that can be exhibited by hot-pressed members having a tensile strength (TS) of 1780 MPa or greater after a nut is projection-welded thereto is difficult. A current situation is that none of the steel sheets that have been developed, including steel sheets of types other than those mentioned, have these characteristics in combination.

Aspects of the present invention have been made in view of the above circumstances. Accordingly, objects according to aspects of the present invention are to provide a hot-pressed member and a method for producing the hot-pressed member, the hot-pressed member having a tensile strength of 1780 MPa or greater and, in particular, having improved delayed fracture resistance that can be exhibited after a nut is projection-welded to the hot-pressed member, and to provide a cold-rolled steel sheet for the hot-pressed member and a method for producing the cold-rolled steel sheet.

In view of the current situation described above, the present inventors diligently performed studies and obtained the knowledge that the following steps (a) and (b) are effective for improving the delayed fracture resistance that can be exhibited by a hot-pressed member after a nut is projection-welded thereto: (a) inhibiting variations in hardness due to segregation of Mn in a surface layer of a steel sheet and (b) providing a Ni diffusion region in the surface layer to reduce a potential difference between the welded portion and a bolt and nut, thereby inhibiting the generation of hydrogen.

With this knowledge, it has become possible to inhibit the generation of hydrogen associated with corrosion, which in turn inhibits the formation of microcracks at the interface between a nut and a steel sheet and, consequently, improves delayed fracture resistance. This is a finding that was made.

After a motor vehicle body is finally produced, as actual running is repeated, rain and the like are experienced; as a result, hydrogen is electrochemically generated on the steel sheet, and a portion of the hydrogen is absorbed into the steel sheet. In an instance where no stresses are generated in the steel sheet, delayed fracture due to hydrogen does not occur; however, the portion to which a nut has been welded may experience stress after a bolt is tightened thereto. In such a case, microcracks are initiated at the interface between the nut and the steel sheet and at a region near the interface, and consequently, cracking occurs. In particular, after welding, a crevice is present between the nut and the steel sheet. Since oxygen does not diffuse sufficiently in the site, a pH in the crevice decreases. In this instance, the welded portion exhibits a less noble potential than the bolt, the nut, and the portion of the steel sheet excluding the welded portion; as a result, hydrogen is generated in the crevice, and a portion of the hydrogen is absorbed into the welded portion, which can result in delayed fracture. It was discovered that a possible approach for addressing this is to provide a Ni diffusion layer on a surface, by which the potential difference between the potential of the bolt and the nut and the potential of the welded portion can be reduced, and, consequently, uniform corrosion is achieved. As a result, delayed fracture resistance is improved. In addition, it was discovered that if a projection of a nut is welded to a region containing a large amount of Mn due to segregation, the potential difference cannot be reduced, and, therefore, inhibiting segregation of Mn further improves delayed fracture resistance.

Aspects of the present invention are based on the knowledge described above.

[1] A hot-pressed member including a steel sheet and a surface layer disposed on a surface of the steel sheet, the steel sheet having a chemical composition containing, in mass %, C: 0.28% or greater and less than 0.50%, Si: 0.01% or greater and 1.5% or less, Mn: 1.0% or greater and 2.2% or less, P: 0.05% or less, S: 0.005% or less, Al: 0.01% or greater and 0.50% or less, N: 0.01% or less, Sb: 0.001% or greater and 0.020% or less, and one or more selected from Mo: 0.005% or greater and 0.35% or less, Cr: 0.005% or greater and 0.35% or less, Nb: 0.001% or greater and 0.05% or less, Ti: 0.001% or greater and 0.05% or less, B: 0.0002% or greater and 0.0050% or less, Ca: 0.005% or less, V: 0.05% or less, Cu: 0.50% or less, Ni: 0.50% or less, and Sn: 0.50% or less, with the balance being Fe and incidental impurities, wherein, in the hot-pressed member the steel sheet has a microstructure in which a prior austenite average grain diameter is 8 μm or less, and martensite is present in a volume fraction of 95% or greater in a region within 30 μm of the surface of the steel sheet of the hot-pressed member, a Ni diffusion region having a thickness of 0.5 μm or greater exists in the surface layer, a standard deviation of Vickers hardness values of the hot-pressed member is 35 or less, Mndif (mass %) in a sheet thickness direction=Mnmax (mass %)−Mnmin (mass %)≤0.20, where Mndif (mass %) is a degree of Mn segregation,
Mnmax (mass %) is a maximum value of amounts of Mn measured by EPMA line analysis in a sheet thickness direction, and
Mnmin (mass %) is a minimum value of the amounts of Mn measured by EPMA line analysis in a sheet thickness direction, and the hot-pressed member has a tensile strength of 1780 MPa or greater.

[2] A cold-rolled steel sheet for a hot-pressed member, the cold-rolled steel sheet including a Ni-containing coating layer disposed on a surface of the steel sheet, the steel sheet having a chemical composition containing, in mass %, C: 0.28% or greater and less than 0.50%, Si: 0.01% or greater and 1.5% or less, Mn: 1.0% or greater and 2.2% or less, P: 0.05% or less, S: 0.005% or less, Al: 0.01% or greater and 0.50% or less, N: 0.01% or less, Sb: 0.001% or greater and 0.020% or less, and one or more selected from Mo: 0.005% or greater and 0.35% or less, Cr: 0.005% or greater and 0.35% or less, Nb: 0.001% or greater and 0.05% or less, Ti: 0.001% or greater and 0.05% or less, B: 0.0002% or greater and 0.0050% or less, Ca: 0.005% or less, V: 0.05% or less, Cu: 0.50% or less, Ni: 0.50% or less, and Sn: 0.50% or less, with the balance being Fe and incidental impurities, wherein the steel sheet has a microstructure in which ferrite having an average grain aspect ratio of 2.5 or less is present in a volume fraction of 20% or greater, a standard deviation of Vickers hardness values of the steel sheet is 30 or less, Mndif (mass %) in a sheet thickness direction=Mnmax (mass %)−Mnmin (mass %)≤0.20, where Mndif (mass %) is a degree of Mn segregation,
Mnmax (mass %) is a maximum value of amounts of Mn measured by
EPMA line analysis in a sheet thickness direction, and
Mnmin (mass %) is a minimum value of the amounts of Mn measured by EPMA line analysis in a sheet thickness direction, and
the Ni-containing coating layer has a thickness of 0.5 μm or greater.

[3] A method for producing a hot-pressed member, the method including heating the cold-rolled steel sheet for a hot-pressed member according to [2] in a temperature range of an $Ac_3$ transformation temperature to 1100° C.; and subsequently hot-pressing the steel sheet.

[4] A method for producing a cold-rolled steel sheet for a hot-pressed member, the method including forming a continuously cast slab from molten steel having the chemical composition according to [2], cooling the continuously cast slab to 850° C. at an average cooling rate of 20° C./hr or greater, and subsequently cooling the continuously cast slab to 650° C. at an average cooling rate of 150° C./hr or less; subsequently reheating the continuously cast slab and then hot-rolling the continuously cast slab under conditions in which a reduction ratio for a final pass of finish rolling is 10% or greater, a reduction ratio for a pass preceding the final pass is 12% or greater, and a finishing delivery temperature is 850 to 950° C.; after the hot-rolling, performing primary cooling, in which a resulting steel sheet is cooled to a cooling stop temperature of 700° C. or less at a first average cooling rate of 55° C./s or greater, and after the primary cooling, performing a secondary cooling, in which the resulting steel sheet is cooled to a coiling temperature of 650° C. or less at a second average cooling rate of 5 to 50° C./s; subsequently coiling and pickling the resulting steel sheet; subsequently cold-rolling the resulting steel sheet; subsequently heating the resulting steel sheet to a temperature range of 600 to 820° C. at an average heating rate of 30° C./s or less, then holding the resulting steel sheet in a soaking temperature range of 600 to 820° C. for 20 seconds or more and 30000 seconds or less, and subsequently cooling the resulting steel sheet to room temperature; and subsequently subjecting the resulting steel sheet to a coating process for applying a Ni-containing coating layer to a surface of the steel sheet.

According to aspects of the present invention, hot-pressed members can be stably obtained which have a very high tensile strength of 1780 MPa or greater and in which a standard deviation of Vickers hardness values is 35 or less. As a result, hot-pressed members having excellent delayed fracture resistance compared with those of the conventional art can be obtained. In instances where any of the hot-pressed members according to aspects of the present invention is used in, for example, an automotive structural member, the weight of the vehicle body is reduced, and, consequently, fuel efficiency is improved; therefore, the hot-pressed members provide very high utility for the industry.

DETAILED DESCRIPTION OF EMBODIMENTS OF THE INVENTION

Aspects of the present invention will be described in detail below. In the following description, a chemical composition of a hot-pressed member and a cold-rolled steel sheet for a hot-pressed member that are in accordance with aspects of the present invention will be described in detail. In the following description, the symbol "%" used to indicate contents of component elements of the hot-pressed member and the cold-rolled steel sheet for a hot-pressed member that are in accordance with aspects of the present invention means "mass %" unless otherwise specified.

C: 0.28% or greater and less than 0.50%

C is an element effective for increasing the strength of a steel sheet. C is an important element for ensuring strengthened martensite exists after hot pressing, thereby enhancing the strength of the steel. If a C content is less than 0.28%, a hardness of the martensite that exists after hot pressing is insufficient, and, consequently, tensile strength is inadequate. Preferably, the C content is greater than or equal to 0.30%. On the other hand, if the C content is greater than or equal to 0.50%, a microstructure of the cold-rolled steel sheet and a microstructure that exists after hot pressing are non-uniform; in addition, a hardness of a welded portion is increased, which reduces the toughness thereof, and, consequently, the delayed fracture resistance of the welded portion is reduced. The C content is preferably less than 0.45% and more preferably less than 0.40%.

Si: 0.01% or Greater and 1.5% or Less

Si is an element effective for increasing strength because Si strengthens ferrite through solid solution strengthening. Producing this effect requires the presence of Si in an amount greater than or equal to 0.01%. However, if an excessive amount of Si is present, chemical convertibility is degraded, and, therefore, a Si content is to be less than or equal to 1.5% and preferably less than or equal to 1.0%.

Mn: 1.0% or Greater and 2.2% or Less

Mn increases hardenability associated with hot pressing. Accordingly, Mn is an element that contributes to ensuring martensite exists after hot pressing and, therefore, increasing strength. Producing this effect requires the presence of Mn in an amount greater than or equal to 1.0%. Preferably, a Mn content is greater than or equal to 1.2%. On the other hand, if an excessive amount of Mn is present, Mn bands are excessively formed, which causes a potential of a welded portion to be shifted to the less noble side, and, consequently, delayed fracture resistance is reduced. Accordingly, the content is to be less than or equal to 2.2% and preferably less than or equal to 2.0%.

P: 0.05% or Less

P contributes to increasing strength through solid solution strengthening. However, if an excessive amount of P is present, noticeable segregation of P occurs at grain boundaries, which embrittles the grain boundaries, and, consequently, delayed fracture resistance is reduced. Accordingly, a P content is to be less than or equal to 0.05% and preferably less than or equal to 0.04%. The lower limit of the P content is not particularly specified, and the P content may be 0%. However, in such a case, the cost of steel making increases, and, therefore, it is preferable that the P content be greater than or equal to 0.0005%.

S: 0.005% or Less

If a S content is high, large numbers of sulfides such as MnS form, which leads to the occurrence of cracking because such inclusions act as initiation sites, and, consequently, delayed fracture resistance is reduced. Accordingly, the content is to be less than or equal to 0.005% and preferably less than or equal to 0.004%. The lower limit of the S content is not particularly specified, and the S content may be 0%. However, in such a case, the cost of steel making increases as with P, and, therefore, it is preferable that the S content be greater than or equal to 0.0002%.

Al: 0.01% or Greater and 0.50% or Less

Al is an element necessary for deoxidation, and producing this effect requires the presence of Al in an amount greater than or equal to 0.01%. However, when Al is present in an amount greater than 0.50%, the effect no longer increases. Accordingly, an Al content is to be less than or equal to 0.50% and preferably less than or equal to 0.40%.

N: 0.01% or Less

N forms a coarse nitride, which reduces delayed fracture resistance, and, therefore, a content thereof needs to be limited. If N is present in an amount greater than 0.01%, the tendency is noticeable. Accordingly, a N content is to be less than or equal to 0.01% and preferably less than or equal to 0.008%. Note that the lower limit of the N content is not particularly specified, and the N content may be 0%. However, from the standpoint of the cost of steel making, it is preferable that the N content be greater than or equal to 0.0005%.

Sb: 0.001% or Greater and 0.020% or Less

Sb is an element effective for homogenizing a microstructure of a cold-rolled steel sheet. In particular, in a series of processes of hot pressing, Sb produces an effect of inhibiting a decarburization layer from forming in a surface layer portion of a steel sheet during a time period from the time at which the steel sheet to be hot-pressed is heated to the time at which the cooling of the hot-pressed steel sheet is started, thereby homogenizing the microstructure. As a result, the potential distribution of the surface layer portion is uniform, and, therefore, delayed fracture resistance is improved. To produce this effect, a Sb content is specified to be greater than or equal to 0.001%. On the other hand, if Sb is present in an amount greater than 0.020%, the load applied in rolling increases, which reduces productivity. Accordingly, the Sb content is specified to be less than or equal to 0.020%.

In accordance with aspects of the present invention, one or more of the following components are to be included, in addition to the components described above.

Mo: 0.005% or Greater and 0.35% or Less

Mo increases hardenability associated with hot pressing. Accordingly, Mo is an element that contributes to ensuring martensite exists after hot pressing and, therefore, increasing strength. Producing this effect requires the presence of Mo in an amount greater than or equal to 0.005%. Preferably, a Mo content is greater than or equal to 0.01%. On the other hand, even if a large amount of Mo is present, the effect no longer increases, the cost increases, and chemical convertibility is degraded. Accordingly, the content is specified to be less than or equal to 0.35%.

Cr: 0.005% or Greater and 0.35% or Less

Similar to Mo, Cr increases hardenability associated with hot pressing. Accordingly, Cr is an element that contributes to ensuring martensite exists after hot pressing and, therefore, increasing strength. Producing this effect requires the presence of Cr in an amount greater than or equal to 0.005%. Preferably, a Cr content is greater than or equal to 0.010%. On the other hand, even if a large amount of Cr is present, the effect no longer increases, and a surface oxide forms, which degrades a coating property. Accordingly, the content is specified to be less than or equal to 0.35%.

Nb: 0.001% or Greater and 0.05% or Less

Nb is an element that can contribute to increasing strength by forming a fine-grained carbonitride. In addition, since Nb reduces the austenite grain diameter during hot pressing, Nb is an element that contributes to improving delayed fracture resistance. To produce these effects, a Nb content is specified to be greater than or equal to 0.001%. Preferably, the Nb content is greater than or equal to 0.010%. On the other hand, even if a large amount of Nb is present, the effects no longer increase, and the cost increases. Accordingly, the content is specified to be less than or equal to 0.05%. The Nb content is preferably less than or equal to 0.04% and more preferably less than or equal to 0.03%.

Ti: 0.001% or Greater and 0.05% or Less

Ti is an element that can contribute to increasing strength by forming a fine-grained carbonitride. Since Ti reduces the austenite grain diameter during hot pressing, Ti is an element that contributes to improving delayed fracture resistance. To produce these effects, a Ti content is specified to be greater than or equal to 0.001%. On the other hand, if a large amount of Ti is present, an elongation that can be exhibited after hot pressing is significantly reduced. Accordingly, the content is to be less than or equal to 0.05% and preferably less than or equal to 0.04%.

B: 0.0002% or Greater and 0.0050% or Less

B increases hardenability associated with hot pressing. Accordingly, B is an element that contributes to ensuring martensite exists after hot pressing and, therefore, increasing strength. Furthermore, B segregates at grain boundaries and, accordingly, improves grain boundary strength; therefore, B is effective for delayed fracture resistance. B is to be present in an amount greater than or equal to 0.0002% so as to produce these effects. However, if an excessive amount of B is present, B forms coarse precipitates with N and, therefore, reduces delayed fracture resistance. Accordingly, a content of B is specified to be less than or equal to 0.0050%. Preferably, the B content is less than or equal to 0.0035%.

Ca: 0.005% or Less

Ca controls shapes of sulfides and oxides to inhibit the formation of coarse MnS, thereby improving delayed fracture resistance. In terms of producing the effect, it is preferable that Ca be present in an amount greater than or equal to 0.0005%. If an excessive amount of Ca is present, workability is degraded. Accordingly, a Ca content is specified to be less than or equal to 0.005%.

V: 0.05% or Less

V can contribute to increasing strength by forming a fine-grained carbonitride. Because of this effect, it is preferable that a V content be greater than or equal to 0.01%. On the other hand, if a large amount of V is present, delayed fracture resistance is degraded. Accordingly, the content is specified to be less than or equal to 0.05%.

Cu: 0.50% or Less

Cu contributes to increasing strength through solid solution strengthening and improves corrosion resistance, which in turn improves delayed fracture resistance. In terms of producing these effects, it is preferable that Cu be present in an amount greater than or equal to 0.05%. On the other hand, even if Cu is present in an amount greater than 0.50%, the effects no longer increase, and a surface defect attributable to Cu tends to occur. Accordingly, a content of Cu is specified to be less than or equal to 0.50%.

Ni: 0.50% or Less

Similar to Cu, Ni improves corrosion resistance and reduces the potential difference between a welded portion and a nut and bolt, which in turn improve delayed fracture resistance. Furthermore, when Ni is present with Cu, an effect of inhibiting a Cu-caused surface defect is produced. In this regard, Ni is effective. In terms of producing these effects, it is preferable that Ni be present in an amount greater than or equal to 0.05%. However, if a large amount of Ni is added, delayed fracture resistance is reduced. Accordingly, a content of Ni is specified to be less than or equal to 0.50%.

Sn: 0.50% or Less

Similar to Cu, Sn improves corrosion resistance, which in turn improves delayed fracture resistance. Accordingly, Sn may be present, as necessary. In terms of producing these effects, it is preferable that Sn be present in an amount greater than or equal to 0.05%. However, if a large amount of Sn is present, delayed fracture resistance is reduced. Accordingly, a content of Sn is specified to be less than or equal to 0.50%.

The balance, other than the elements described above, is Fe and incidental impurities. Examples of the incidental impurities include Zn, Co, Zr, Ta, and W, and permissible ranges of contents thereof are Zn: 0.01% or less, Co: 0.10% or less, Zr: 0.10% or less, Ta: 0.10% or less, and W: 0.10% or less. In addition, in instances where any of the above-described elements is present in an amount less than the lower limit thereof, it is to be understood that the element is present as an incidental impurity.

Now, a microstructure of the hot-pressed member and the cold-rolled steel sheet for a hot-pressed member that are in accordance with aspects of the present invention will be described in detail.

Microstructure of Hot-Pressed Member

The hot-pressed member includes a steel sheet and a surface layer disposed on a surface of the steel sheet. The steel sheet of the hot-pressed member has a microstructure in which a prior austenite average grain diameter is 8 μm or less, and martensite is present in a volume fraction of 95% or greater in a region within 30 μm of the surface of the steel sheet. As referred to herein, the "surface of the steel sheet" refers to the interface between the surface layer of the hot-pressed member and the steel sheet thereof. Note that as referred to herein, the "volume fraction" is a volume fraction relative to a volume of the entirety of the steel sheet, and the same applies to those in the description below.

If the prior austenite average grain diameter exhibited after hot pressing is greater than 8 μm, the toughness of a projection-welded portion is reduced, and, therefore, delayed fracture resistance is degraded. Accordingly, the prior austenite average grain diameter is to be less than or equal to 8 μm and preferably less than or equal to 7 μm.

Furthermore, if the volume fraction of martensite in the region within 30 μm of the surface of the steel sheet is less than 95%, the desired tensile strength cannot be achieved. Accordingly, the volume fraction of martensite is specified to be greater than or equal to 95%.

Furthermore, in cases where a Ni diffusion region having a thickness of 0.5 μm or greater exists in the surface layer of the hot-pressed member, the potential difference between a welded portion and a nut and bolt exhibited after welding is reduced, as described above, and, therefore, delayed fracture resistance is improved. Accordingly, it is to be ensured that a Ni diffusion region having a thickness of 0.5 μm or greater exists in the surface layer of the hot-pressed steel sheet.

Standard deviations of Vickers hardness values of the hot-pressed member and the cold-rolled steel sheet for hot pressing, as measured on the surfaces thereof, are specified to be 35 or less and 30 or less, respectively. Standard deviations of greater than 35 and greater than 30 for the respective cases mean that a difference in hardness due to segregation of Mn has occurred. If a projection of a nut is welded to a portion having a high hardness due to the segregation, the potential is shifted to the less noble side because of the high amount of Mn. Consequently, a potential difference occurs between the nut and bolt and the welded portion, which degrades delayed fracture resistance. Note that the Vickers hardness may be measured at points with a constant spacing of, for example, 100 to 400 μm on the surface of the hot-pressed member. In particular, it is preferable that the Vickers hardness be measured every 200 μm.

Microstructure of Cold-Rolled Steel Sheet for Hot-Pressed Member

The cold-rolled steel sheet for a hot-pressed member includes a Ni-containing coating layer disposed on a surface of the steel sheet. The Ni-containing coating layer has a thickness of 0.5 μm or greater. After the cold-rolled steel sheet for a hot-pressed member is hot-pressed, the Ni-containing coating layer constitutes the surface layer of the hot-pressed member described above. As referred to herein, the "Ni-containing coating layer" includes a Ni coating layer and may also include Zn, in instances in which the Ni-containing coating layer is a Ni-containing coating layer applied to the cold-rolled steel sheet. An example thereof is a Zn-10 to 15% Ni coating layer, and this example is a non-limiting example. When the cold-rolled steel sheet that includes a Ni-containing coating layer applied thereto is hot-pressed, an alloy layer is formed on the surface of the cold-rolled steel sheet, between the Ni-containing coating layer and the cold-rolled steel sheet. For example, in an instance where a Zn-10 to 15% Ni coating layer as described above is used, an alloy layer containing 25% or less Ni and 10% or less Fe is formed on the surface of the cold-rolled steel sheet. The alloy layer, which is formed as a result of hot pressing, serves as the Ni diffusion region that is effective in accordance with aspects of the present invention and improves delayed fracture resistance. What is important in terms of achieving desired properties of the hot-pressed member is to control a microstructure of the cold-rolled steel sheet for a hot-pressed member. Specifically, in the microstructure of the cold-rolled steel sheet for a hot-pressed member, ferrite having an average grain aspect ratio of 2.5 or less is to be present in a volume fraction of 20% or greater. In addition, in the cold-rolled steel sheet for a hot-pressed member, a standard deviation of Vickers hardness values as measured on the surface thereof is to be 30 or less.

If the average grain aspect ratio of the ferrite is greater than 2.5, the desired prior austenite average grain diameter, which is to be exhibited after hot pressing, cannot be ensured, and, consequently, resistance to resistance welding cracking and delayed fracture resistance are reduced. In instances where the volume fraction of the ferrite is less than 20%, the desired prior austenite average grain diameter, which is to be exhibited after hot pressing, also cannot be ensured because recrystallization due to reverse transformation during hot pressing is not sufficiently achieved; consequently, delayed fracture resistance is reduced. The constituents of the microstructure can be examined as follows: etching is performed with 3 vol % nital, and subsequently, examination is performed by using a method to be described later in the Examples section, with a scanning electron microscope (SEM) or an optical microscope, for example.

Mndif (mass %)≤0.20%, where Mndif is Degree of Mn Segregation in Hot-Pressed Member and Cold-Rolled Steel Sheet for Hot Pressing Obtaining a hot-pressed member that has a tensile strength of 1780 MPa or greater and exhibits improved delayed fracture resistance, in particular, after a nut is projection-welded thereto, requires inhibition of segregation of Mn in the surface of the steel sheet of the hot-pressed member and the surface of the cold-rolled steel sheet for hot pressing. A degree of Mn segregation is defined by the following formula.

Mndif (mass %) in a sheet thickness direction=Mnmax (mass %)−Mnmin (mass %)≤0.20%, where Mndif (mass %) is a degree of Mn segregation,
Mnmax (mass %) is a maximum value of amounts of Mn measured by EPMA line analysis in a sheet thickness direction, and
Mnmin (mass %) is a minimum value of the amounts of Mn measured by EPMA line analysis in a sheet thickness direction.

When there is segregation of Mn, the non-uniformity of components in the steel sheet results in uneven distribution of a noble region and a less noble region in the steel sheet, which reduces the delayed fracture resistance that can be exhibited by a welded portion after a nut is projection-welded to the steel sheet. Accordingly, it is necessary that the degree of Mn segregation in the sheet thickness direction be less than or equal to 0.20%. Preferably, the degree of Mn segregation is less than or equal to 0.15%. Note that the degree of Mn segregation in the sheet thickness direction was determined as follows: cross sections along the sheet thickness direction of the hot-pressed member and the cold-rolled steel sheet for hot pressing, the cross sections excluding those of the coating layers, were measured by performing a line analysis with an electron probe microanalyzer (EPMA), at a step of 0.5 μm over a region from the surface of the steel sheet to a middle portion of the steel sheet.

Now, a preferred method according to aspects of the present invention for producing the cold-rolled steel sheet for hot pressing will be described.

In accordance with aspects of the present invention, in the production of the cold-rolled steel sheet, first, a slab is formed by continuously casting molten steel having a predetermined chemical composition, and the continuously cast slab is cooled to 850° C. at an average cooling rate of 20° C./hr or greater and subsequently cooled to 650° C. at an average cooling rate of 150° C./hr or less.

Subsequently, the slab is reheated, and then the slab is hot-rolled under conditions in which a reduction ratio for the final pass of finish rolling is 10% or greater, a reduction ratio for the pass preceding the final pass is 12% or greater, and a finishing delivery temperature is 850 to 950° C. After the hot rolling, primary cooling is performed in which the resulting steel sheet is cooled to a primary cooling stop temperature of 700° C. or less at a first average cooling rate of 55° C./s or greater. After the primary cooling, secondary cooling is performed in which the resulting steel sheet is cooled to a coiling temperature of 650° C. or less at a second average cooling rate of 5 to 50° C./s, and subsequently, the resulting steel sheet is coiled at the mentioned coiling temperature.

Thereafter, the coiled hot-rolled steel sheet is pickled and subsequently cold-rolled. Thereafter, the resulting steel sheet is heated to a temperature range of 600 to 820° C. at an average heating rate of 30° C./s or less and then held in a soaking temperature range of 600 to 820° C. for 20 seconds or more and 30000 seconds or less. Subsequently, the resulting steel sheet is cooled to room temperature and thereafter subjected to a coating process for applying a Ni-containing coating layer to a surface of the steel sheet.

Each of the production steps described above will be described in detail below.

Continuous Casting

In accordance with aspects of the present invention, a continuous casting method is used to cast the slab. Reasons for employing a continuous casting method are that the continuous casting method is important for achieving the objects according to aspects of the present invention and has higher production efficiency than a mold casting method. It is desirable that a vertical bending type continuous casting machine be used. Reasons for this are that vertical bending type continuous casting machines provide an excellent balance of equipment cost and surface quality and produce a noticeable effect of inhibiting surface microcracks.

After a slab is formed by continuous casting, the continuously cast slab is cooled to 850° C. at an average cooling rate of 20° C./hr or greater and subsequently cooled to 650° C. at an average cooling rate of 150° C./hr or less. After the continuous casting, if the slab is cooled to 850° C. at an average cooling rate less than 20° C./hr, segregation of Mn is promoted, and as a result, the delayed fracture resistance that can be exhibited after hot pressing is reduced. Furthermore, by virtue of the subsequent cooling to 650° C. at an average cooling rate of 150° C./hr or less, ferrite grows uniformly from the grain boundaries during cooling, and as a result, segregation is inhibited. Accordingly, after the continuous casting, the slab is to be cooled to 850° C. at the average cooling rate of 20° C./hr or greater, and subsequently, the slab is to be cooled to 650° C. at the average cooling rate of 150° C./hr or less. Furthermore, after the slab is cooled to 650° C., the slab may be cooled to room temperature and thereafter reheated to be subjected to hot rolling, or the warm slab as it is may be reheated to be subjected to hot rolling.

Heating Step

After the casting, the hot rolling of the steel slab (continuously cast slab), which is a starting material, may be started at a temperature of 1150 to 1270° C. without reheating the steel slab or, preferably, may be started after reheating the steel slab to a temperature of 1150 to 1270° C. A preferred condition of the hot rolling is, first of all, to hot-roll the steel slab at the hot rolling start temperature of 1150 to 1270° C.

Hot Rolling Step

Reduction Ratio for Final Pass of Finish Rolling: 10% or greater

Ensuring the reduction ratio for the final pass of the finish rolling is 10% or greater is necessary for introducing a large number of shear bands into austenite grains to increase the nucleation sites for ferrite transformation that occurs after the hot rolling, thereby achieving the refining of the hot-rolled sheet, so that the desired average aspect ratio of ferrite in the cold-rolled steel sheet can be ensured, and the prior austenite average grain diameter of the hot-pressed member can be reduced. Furthermore, ensuring the reduction ratio is necessary from the standpoint of eliminating Mn bands. Furthermore, ensuring the reduction ratio is effective for refining the steel sheet microstructure of the surface layer. A suitable reduction ratio for the final pass of the finish rolling is greater than or equal to 12%. Furthermore, the upper limit of the reduction ratio is not particularly limited. Preferably, a suitable reduction ratio for the final pass of the finish rolling is less than or equal to 30% because when the load applied in hot rolling increases, variations in the sheet thickness in a width direction of the sheet become large, which may degrade delayed fracture resistance.

Reduction Ratio for Pass Preceding Final Pass of Finish Rolling: 12% or greater

Ensuring the reduction ratio for the pass preceding the final pass is 12% or greater is necessary because with such a reduction ratio, a strain accumulation effect is increased, which enables a large number of shear bands to be introduced into austenite grains to further increase the nucleation sites for ferrite transformation, and, consequently, the microstructure of the hot-rolled sheet is further refined, so that the desired average aspect ratio of ferrite in the cold-rolled steel sheet can be ensured, and the prior austenite average grain diameter of the hot-pressed member can be reduced. Furthermore, ensuring the reduction ratio is necessary from the standpoint of eliminating Mn bands. A suitable reduction ratio for the pass preceding the final pass of the finish rolling is greater than or equal to 15%. Furthermore, the upper limit of the reduction ratio is not particularly limited. Preferably, a suitable reduction ratio for the pass preceding the final pass of the finish rolling is less than or equal to 30% because when the load applied in hot rolling increases, variations in the sheet thickness in the width direction of the sheet become large, which may degrade delayed fracture resistance.

Finishing Delivery Temperature: 850 to 950° C.

The hot rolling needs to be completed in an austenite single phase region so that a uniform and refined microstructure can be formed in the steel sheet, and the anisotropy of the material can be reduced, to improve the delayed fracture resistance that can be exhibited after annealing. Accordingly, the finishing delivery temperature is specified to be greater than or equal to 850° C. On the other hand, if the finishing delivery temperature is greater than 950° C., the hot-rolling microstructure is coarse, and the grains that exist after annealing are also coarse. Accordingly, the finishing delivery temperature is specified to be less than or equal to 950° C.

Cooling Step after Hot Rolling

Primary Cooling Step: cooling steel sheet to 700° C. or less at first average cooling rate of 55° C./s or greater In the cooling process after completion of the hot rolling, austenite transforms into ferrite. Since the ferrite becomes coarse at high temperatures, rapid cooling is to be performed after completion of the hot rolling so that the microstructure can be as homogeneous as possible. Accordingly, first, primary cooling is to be performed to cool the steel sheet to 700° C. or less at a first average cooling rate of 55° C./s or greater. If the first average cooling rate is less than 55° C./s, the ferrite becomes coarse, and the resulting steel sheet microstructure of the hot-rolled steel sheet is inhomogeneous; consequently, the microstructure of the cold-rolled steel sheet is non-uniform, the microstructure that exists after hot pressing is non-uniform, the prior austenite grain diameter is increased, and delayed fracture resistance is reduced. On the other hand, if the cooling stop temperature for the primary cooling is greater than 700° C., the ferrite becomes coarse, and an excessive amount of pearlite forms in the steel sheet microstructure of the hot-rolled steel sheet; consequently, the final steel sheet microstructure is inhomogeneous, and, therefore, delayed fracture resistance is reduced. Note that it is preferable that the primary cooling stop temperature be within a range of a coiling temperature (CT)+40 to 140° C.

Secondary Cooling Step: cooling steel sheet to coiling temperature at a second average cooling rate of 5 to 50° C./s If the average cooling rate for the secondary cooling is less than 5° C./s, an excessive amount of ferrite or pearlite forms in the steel sheet microstructure of the hot-rolled steel sheet, and the ferrite becomes coarse; consequently, the final steel sheet microstructure is inhomogeneous, and, therefore, delayed fracture resistance is reduced. On the other hand, if the average cooling rate for the secondary cooling is greater than 50° C./s, the effect of inhibiting the excessive formation of ferrite or pearlite no longer increases. In addition, if the cooling lasts only until a temperature greater than the coiling temperature is reached, an excessive amount of coarse ferrite or pearlite forms in the steel sheet microstructure of the hot-rolled steel sheet; consequently, the final steel sheet microstructure is inhomogeneous, and, therefore, delayed fracture resistance is reduced.

Coiling Temperature: 650° C. or less

If the coiling temperature is greater than 650° C., coarse ferrite and pearlite form in the steel sheet microstructure of the hot-rolled steel sheet; consequently, the final steel sheet microstructure is inhomogeneous, and, therefore, delayed fracture resistance is reduced. Accordingly, in accordance with aspects of the present invention, the upper limit of the coiling temperature is specified to be 650° C. Preferably, the coiling temperature is less than or equal to 600° C. Note that the lower limit of the coiling temperature is not particularly limited, and it is preferable that the coiling temperature be greater than or equal to 300° C. because if the coiling temperature is too low, an excessive amount of hard martensite forms, which increases the load of cold rolling.

Pickling Step

After the hot rolling step, pickling is to be performed to remove scale from the surface layer of the hot-rolled sheet. The pickling process is not particularly limited and may be carried out in accordance with a commonly used method.

Cold Rolling Step

Cold rolling is to be performed to roll the steel sheet to form a cold-rolled sheet having a predetermined sheet thickness. The cold rolling step is not particularly limited and may be carried out in accordance with a commonly used method.

Annealing Step

Annealing is to be performed to allow recrystallization to progress after the cold rolling and to control the hardness distribution that exists after hot pressing and refine the steel sheet microstructure. In the annealing step, the cold-rolled sheet is heated to a temperature range of 600 to 820° C. at an average heating rate of 30° C./s or less, and then the steel sheet is held at a soaking temperature within a temperature range of 600 to 820° C. for 20 seconds or more and 30000 seconds or less and subsequently cooled to room temperature.

Average Heating Rate: 30° C./s or less

Controlling the heating rate for the annealing step enables homogenization of the microstructure of the cold-rolled steel sheet that exists after the annealing. If the steel sheet is heated rapidly, recrystallization cannot progress easily; consequently, the microstructure is inhomogeneous, and, therefore, delayed fracture resistance is reduced. The average heating rate over a range of room temperature to the soaking temperature is specified to be 30° C./s or less. Note that it is preferable that the average heating rate be greater than or equal to 0.1° C./s.

Soaking Temperature: 600 to 820° C., Holding Time: 20 to 30000 seconds

The soaking temperature is to be within a temperature range higher than a recrystallization temperature. If the soaking temperature is less than 600° C., and/or the holding time is less than 20 seconds, sufficient recrystallization is not achieved, and as a result, ensuring the desired average aspect ratio of ferrite in the cold-rolled steel sheet is difficult; in addition, a difference in hardness occurs on the surface, the resulting microstructure is inhomogeneous, and the delayed fracture resistance that can be exhibited after hot pressing is reduced. Accordingly, the soaking temperature is specified to be greater than or equal to 600° C., and the holding time is specified to be greater than or equal to 20 seconds. On the other hand, if the soaking temperature is greater than 820° C., and/or the holding time is greater than 30000 seconds, the grains coarsen during the soaking, and, consequently, the desired volume fraction of ferrite of the cold-rolled steel sheet cannot be achieved. Furthermore, the microstructure that exists after hot pressing is non-uniform, the prior austenite grain diameter is increased, and, therefore, the delayed fracture resistance is reduced. Accordingly, the soaking temperature is to be less than or equal to 820° C. and preferably less than or equal to 800° C. The holding time is to be less than or equal to 30000 seconds and preferably less than or equal to 20000 seconds.

Coating Step

The method according to aspects of the present invention for producing the cold-rolled steel sheet for a hot-pressed member includes a coating step for applying a Ni-containing coating layer. The coating step is not limited in any way and may employ any of the known methods, such as a hot-dip galvanizing method, an electrodeposition coating method, and a vapor deposition coating method. In addition, an alloying process may be performed after the coating step.

Note that, optionally, temper rolling may be performed on the cold-rolled steel sheet. In this instance, a suitable elongation ratio is 0.05 to 2.0%.

Now, hot pressing that is performed on the obtained cold-rolled steel sheet will be described.

As a method for the hot pressing, a method for hot pressing known in the art may be employed provided that the steel sheet is to be heated to a temperature range of an $Ac_3$ transformation temperature to 1100° C.

For example, an electric furnace, a gas furnace, an electric heating furnace, a far infrared heating furnace, or the like may be used provided that the cold-rolled steel sheet for a hot-pressed member, which is the workpiece, is to be heated to the temperature range of an $Ac_3$ transformation temperature to 1100° C. If a hot-pressing temperature is less than the $Ac_3$ transformation temperature, forming a desired amount of a martensite phase is difficult, and, consequently, the desired TS cannot be achieved. Furthermore, if the hot-pressing temperature is greater than 1100° C., the prior austenite average grain diameter is increased, and, therefore, excellent delayed fracture resistance cannot be achieved. A holding time, the hot-pressing temperature, and a heating rate are not particularly limited. Preferably, the hot pressing may be performed in the following manner: the steel sheet is held in the above-mentioned temperature range for 0 to 600 seconds, subsequently transferred to a pressing machine, and hot-pressed at a temperature ranging from 550 to 800° C. The heating rate for heating the cold-rolled steel sheet for a hot-pressed member may be 3 to 200° C./s.

The Ac₃ transformation temperature may be determined by using the following equation.

$$Ac_3 \text{ transformation temperature (°C.)} = 881 - 206C + 53Si - 15Mn - 20Ni - 1Cr - 27Cu + 41Mo$$

In the equation, the chemical symbols each represent a content (mass %) of the element, and in an instance where the element is not included, the calculation is to be performed assuming that the content is 0.

EXAMPLES

Examples of the present invention will be described below. Note that the present invention is not intended to be limited by the examples described below and may be practiced with modifications that are appropriately made, provided that the modifications serve the purpose of an aspect of the present invention. All such modifications are encompassed within the technical scope of the present invention.

Steels having the chemical composition shown in Table 1 were produced by steel making and were continuously cast under the conditions shown in Table 2 to form steel slabs. Each of the steel slabs was heated to 1250° C. and subsequently hot-rolled, with the finishing delivery temperature (FDT) being the condition shown in Table 2. Next, the hot-rolled steel sheet was cooled to a cooling stop temperature (first cooling stop temperature) at a first average cooling rate (cooling rate 1) shown in Table 2, and thereafter, the resulting steel sheet was cooled to a coiling temperature (CT) at a second average cooling rate (cooling rate 2) and then coiled. Next, the resulting hot-rolled steel sheet was pickled and thereafter cold-rolled at a reduction ratio shown in Table 2 to form a cold-rolled sheet (sheet thickness: 1.4 mm).

TABLE 1

| Steel type | Chemical composition (mass %) | | | | | | | | | Ac3 (° C.) | Notes |
|---|---|---|---|---|---|---|---|---|---|---|---|
| | C | Si | Mn | P | S | Al | N | Sb | Other components | | |
| A | 0.34 | 0.15 | 1.83 | 0.01 | 0.001 | 0.03 | 0.002 | 0.003 | Ti: 0.02, B: 0.0011, Mo: 0.19 | 799 | Conforming steel |
| B | 0.35 | 0.22 | 1.45 | 0.01 | 0.001 | 0.03 | 0.002 | 0.008 | Nb: 0.01, Ti: 0.02, B: 0.0021, Cr: 0.16 | 799 | Conforming steel |
| C | 0.44 | 0.88 | 1.05 | 0.01 | 0.001 | 0.02 | 0.003 | 0.006 | Mo: 0.12, Cu: 0.15, Nb: 0.01 | 822 | Conforming steel |
| D | 0.32 | 0.64 | 1.78 | 0.02 | 0.001 | 0.02 | 0.002 | 0.012 | Ni: 0.11, V: 0.03, Ti: 003, Ca: 0.001 | 820 | Conforming steel |
| E | <u>0.21</u> | 0.23 | 1.43 | 0.01 | 0.001 | 0.03 | 0.003 | 0.003 | — | 828 | Comparative steel |
| F | <u>0.55</u> | 0.34 | 1.72 | 0.01 | 0.001 | 0.03 | 0.002 | 0.006 | — | 760 | Comparative steel |
| G | 0.33 | 0.19 | 1.34 | 0.01 | 0.001 | 0.04 | 0.002 | <u>—</u> | Ti: 0.02, B: 0.0019, Cr: 0.05 | 803 | Comparative steel |

The underline indicates the value is outside the range of the invention.

TABLE 2

| | | Continuous casting | | Hot rolling | | | | | |
|---|---|---|---|---|---|---|---|---|---|
| Sample No. | Steel type | Average cooling rate over range down to 850° C. (1000° C. to 850° C.) ° C./hr | Average cooling rate over range down to 650° C. (850° C. to 650° C.) ° C./hr | Reduction ratio for pass preceding final pass % | Reduction ratio for final pass % | Finishing delivery temperature FDT ° C. | First average cooling rate (FDT to first cooling stop temperature) ° C./s | First cooling stop temperature ° C. | Second average cooling rate (first cooling stop temperature to CT) ° C./s |
| 1 | A | 40 | 80 | 15 | 18 | 900 | 75 | 680 | 20 |
| 2 | B | 40 | 30 | 15 | 15 | 900 | 85 | 660 | 40 |
| 3 | C | 55 | 110 | 12 | 18 | 900 | 110 | 640 | 20 |
| 4 | D | 40 | 80 | 15 | 14 | 900 | 85 | 660 | 15 |
| 5 | <u>E</u> | 45 | 120 | 15 | 18 | 930 | 110 | 675 | 20 |
| 6 | <u>F</u> | 40 | 80 | 16 | 18 | 900 | 85 | 660 | 45 |
| 7 | <u>G</u> | 25 | 80 | 15 | 18 | 900 | 80 | 695 | 20 |
| 8 | A | <u>5</u> | 80 | 15 | 16 | 900 | 85 | 660 | 20 |
| 9 | A | 40 | <u>200</u> | 17 | 18 | 910 | 85 | 660 | 20 |
| 10 | A | 40 | 80 | <u>5</u> | 18 | 900 | 65 | 675 | 15 |
| 11 | A | 40 | 70 | 15 | <u>5</u> | 900 | 85 | 660 | 20 |
| 12 | A | 40 | 80 | 15 | 18 | <u>750</u> | 55 | 658 | 20 |
| 13 | A | 65 | 60 | 15 | 20 | 900 | <u>30</u> | 660 | 30 |
| 14 | A | 40 | 80 | 15 | 18 | 940 | <u>55</u> | <u>740</u> | 20 |
| 15 | A | 40 | 90 | 18 | 18 | 900 | 85 | <u>660</u> | <u>3</u> |
| 16 | A | 40 | 80 | 13 | 18 | 940 | 65 | 690 | <u>5</u> |
| 17 | A | 70 | 100 | 15 | 18 | 860 | 73 | 695 | 30 |
| 18 | A | 40 | 45 | 18 | 17 | 900 | 85 | 660 | 20 |
| 19 | A | 40 | 80 | 15 | 18 | 900 | 68 | 695 | 20 |
| 20 | A | 35 | 33 | 13 | 18 | 900 | 85 | 660 | 35 |
| 21 | A | 40 | 80 | 15 | 22 | 860 | 85 | 694 | 20 |
| 22 | A | 40 | 35 | 16 | 18 | 900 | 72 | 660 | 40 |
| 23 | A | 40 | 45 | 18 | 17 | 900 | 85 | 660 | 20 |
| 24 | A | 40 | 45 | 18 | 17 | 900 | 85 | 660 | 20 |

TABLE 2-continued

| | | Annealing | | | | | |
|---|---|---|---|---|---|---|---|
| Sample No. | Hot rolling Coiling temperature CT °C. | Average heating rate (room temperature to soaking temperature) °C./s | Soaking temperature °C. | Holding time s | Coating | Hot pressing Heating temperature °C. | Notes |
| 1 | 600 | 6 | 750 | 600 | EZN | 880 | Invention example |
| 2 | 550 | 11 | 650 | 18000 | EZN | 880 | Invention example |
| 3 | 600 | 6 | 780 | 1500 | GA | 880 | Invention example |
| 4 | 520 | 3 | 780 | 12000 | GA | 880 | Invention example |
| 5 | 580 | 6 | 800 | 8500 | GI | 880 | Comparative example |
| 6 | 600 | 6 | 780 | 3000 | GI | 880 | Comparative example |
| 7 | 600 | 10 | 780 | 120 | EZN | 880 | Comparative example |
| 8 | 600 | 6 | 780 | 2500 | EZN | 880 | Comparative example |
| 9 | 590 | 8 | 800 | 2400 | GA | 880 | Comparative example |
| 10 | 600 | 6 | 800 | 6000 | GA | 880 | Comparative example |
| 11 | 580 | 8 | 800 | 15000 | GA | 880 | Comparative example |
| 12 | 600 | 7 | 780 | 600 | GA | 880 | Comparative example |
| 13 | 570 | 6 | 650 | 1000 | GA | 880 | Comparative example |
| 14 | 600 | 8 | 780 | 1000 | GA | 880 | Comparative example |
| 15 | 500 | 10 | 650 | 1000 | GI | 880 | Comparative example |
| 16 | <u>675</u> | 6 | 780 | 1000 | GI | 880 | Comparative example |
| 17 | 600 | <u>50</u> | 650 | 1000 | GI | 880 | Comparative example |
| 18 | 560 | <u>6</u> | <u>550</u> | 1000 | GI | 880 | Comparative example |
| 19 | 620 | 11 | <u>950</u> | 600 | GI | 880 | Comparative example |
| 20 | 620 | 6 | <u>780</u> | 5 | GI | 880 | Comparative example |
| 21 | 630 | 12 | 800 | <u>50000</u> | GI | 880 | Comparative example |
| 22 | 600 | 6 | 800 | 600 | CR | 880 | Comparative example |
| 23 | 560 | 6 | 550 | 1000 | <u>GI</u> | <u>1250</u> | Comparative example |
| 24 | 560 | 6 | <u>550</u> | 1000 | GI | <u>700</u> | Comparative example |

The underline indicates the value is outside the range of the invention.

The cold-rolled sheets obtained as described above were subjected to first and second annealing processes in a continuous annealing line (CAL) or a continuous galvanizing line (CGL) under the conditions shown in Table 2. A steel sheet that passed through only the CAL, that is, a steel sheet that was not subjected to the coating process, formed a cold-rolled steel sheet (CR), and steel sheets that passed through the CGL formed Ni-containing galvanized steel sheets (GI). Note that some of the steel sheets that passed through the CGL were additionally subjected to an alloying process at 550° C. after being subjected to the hot-dip galvanizing process, to form galvannealed steel sheets (GA). Furthermore, some of the steel sheets that had been annealed in the CAL were processed in an electrogalvanizing line (EGL) to form electrodeposited zinc nickel coated steel sheets (EZN).

Next, the obtained cold-rolled steel sheets (including the coated steel sheets) were hot-pressed. The die assembly used in the hot pressing had a punch width of 70 mm, a punch shoulder radius of 4 mm, a die shoulder radius of 4 mm, and a forming depth of 30 mm. The heating of the cold-rolled steel sheet was performed in air by using an infrared heating furnace or an atmosphere heating furnace, depending on the heating rate. Furthermore, the cooling after the hot pressing was performed in a combined manner, that is, the steel sheet was air-cooled while being held between the punch and the die and, in addition, after being released from the state of being held, was air-cooled on the die. Accordingly, cooling from the hot pressing (start) temperature to 150° C. was accomplished. In this instance, the cooling rate was adjusted by varying the time period during which the punch was to be held at the bottom dead center. The time period ranged from 1 to 60 seconds.

A JIS No. 5 tensile test piece was cut from a location of a hat bottom portion of the hot-pressed member obtained as described above, and a tensile test was conducted in accordance with JIS Z 2241 to measure the tensile strength (TS).

Furthermore, a test for the delayed fracture resistance that can be exhibited after projection welding was conducted as follows. First, a test piece measuring 50 mm×150 mm was cut from each of the various hot-pressed members, and a hole having a diameter of 9 mm was made in a middle of the test piece. An M8 weld nut having three projections was positioned in an AC welding machine in a manner such that a center of the hole of the nut coincided with a center of the hole of the test piece, and then welding was performed. Regarding the conditions for the resistance welding, a single-phase alternating current (50 Hz) resistance welding machine of a servo-motor-pressurizing type, the servo motor being attached to a welding gun, was used to perform the welding. Thus, a test piece having a projection-welded portion was prepared. Note that the pair of electrode tips used were flat-type electrodes of 30 mm φ. The welding conditions included an electrode force of 3200 N, a welding time of 5 cycles (50 Hz), a welding current of 12 kA, and a holding time of 10 cycles (50 Hz).

A bolt was secured to the hole of the nut of the welded body obtained as described above, and subsequently, an indentation-peel test was conducted in accordance with JIS B 1196: 2001 to measure the load at which the nut was peeled off from the steel sheet. The peel strength in this instance was designated as Fs. A bolt-tightened test piece was prepared in a manner similar to that just described, and a load of 0.7×FS was applied thereto. Subsequently, the test piece was immersed in a solution of hydrochloric acid (pH=2.0) at room temperature to evaluate whether the nut was peeled off from the steel sheet. Determinations were made that in the instance where no fracture occurred for 100 hours or more under either of the loads, the delayed fracture resistance was "satisfactory" (◯), and in the instance where fracture occurred before 100 hours, the delayed fracture resistance was "unsatisfactory" (x).

The volume fraction of martensite of the hot-pressed member that resulted from the hot pressing was determined as follows. A cross section along the sheet thickness and parallel to a rolling direction of the steel sheet was polished and then etched with 3 vol % nital. Examination was performed with an SEM (scanning electron microscope) at magnifications of 2000× and 5000×, and an area ratio was measured by using a point counting method (in accordance with ASTM E562-83 (1988)), and the area ratio was used as the volume fraction.

The prior austenite average grain diameter of the hot-pressed member was determined as follows. A cross section along the sheet thickness and parallel to the rolling direction of the steel sheet was polished and then etched with 3 vol % nital, and examination was performed with an SEM (scanning electron microscope) at a magnification of 3000×. Equivalent circular diameters of prior austenite grains were calculated by using Image-Pro, available from Media Cybernetics, Inc., and the values were averaged.

The thickness of an Fe—Ni diffusion region (the Ni diffusion region) in the surface layer of the hot-pressed member was determined as follows. A cross section along the sheet thickness and parallel to the rolling direction of the hot-pressed steel sheet was polished, and subsequently elemental distributions of Fe and Ni of the surface layer were mapped by using an EPMA. Regions in which both Fe and Ni were detected were designated as the Fe—Ni diffusion regions, and an average of the thicknesses of the regions was determined.

The standard deviation of Vickers hardness values was determined as follows. The hot-pressed member that resulted from the hot pressing and the cold-rolled steel sheet for hot pressing were subjected to a measurement of the Vickers hardness, which was performed 15 times for each of them, in a direction horizontal to the surfaces thereof; the Vickers hardness was measured every 200 μm in a direction perpendicular to the rolling direction. The standard deviation was determined from the values of the Vickers hardness (N=15). The measurement conditions for the Vickers hardness included a test force of 300 g (2.942 N) and a holding time of 15 seconds.

The volume fraction of ferrite was determined as follows. A cross section along the sheet thickness and parallel to the rolling direction of the steel sheet was polished and then etched with 3 vol % nital. Examination was performed with an SEM (scanning electron microscope) at magnifications of 2000 and 5000 times, and an area ratio was measured by using the point counting method (in accordance with ASTM E562-83 (1988)), and the area ratio was used as the volume fraction.

The aspect ratio was determined as follows. In photographs of the steel sheet microstructure at magnifications of 2000 and 5000 times, equivalent circular diameters of all ferrite grains in the photographs of the microstructure were calculated by using Image-Pro, available from Media Cybernetics, Inc., and aspect ratios thereof were determined. Then, the aspect ratios were averaged.

The thickness of the Ni coating layer was determined as follows. A cross section along the sheet thickness and parallel to the rolling direction of the steel sheet was polished. Subsequently, an elemental distribution of Ni of the surface layer was mapped by using an EPMA, and, accordingly, an average of the thicknesses was determined.

Mndif was determined as follows. A cross section along the sheet thickness and parallel to the rolling direction of the steel sheet was polished. Subsequently, amounts of Mn were measured by EPMA line analysis in the sheet thickness direction; the maximum value was designated as Mnmax (mass %), the minimum value was designated as Mnmin (mass %), and Mnmax−Mnmin was calculated.

The measurement results of the steel sheet microstructure, the tensile property, and the delayed fracture resistance determined as described above are shown in Table 3.

TABLE 3

| | Steel sheet microstructure of cold-rolled steel sheet | | | | | Steel sheet microstructure of hot-pressed member | |
|---|---|---|---|---|---|---|---|
| | Ferrite | | Standard | Thickness of | | | |
| Sample No. | Average grain aspect ratio | Volume fraction (%) | deviation of Vickers hardness values | Ni-containing coating layer μm | Mndif (mass %) | Martensite Volume fraction (%) | Prior austenite Average grain diameter (μm) |
| 1 | 1.8 | 81 | 21 | 6 | 0.12 | 99 | 6 |
| 2 | 2.3 | 85 | 23 | 12 | 0.14 | 99 | 6 |
| 3 | 1.6 | 80 | 24 | 12 | 0.15 | 100 | 6 |
| 4 | 2.1 | 95 | 29 | 3 | 0.12 | 99 | 6 |
| 5 | 2.1 | 89 | 21 | 8 | 0.15 | 99 | 6 |
| 6 | 2.6 | 62 | 40 | 6 | 0.13 | 99 | 7 |
| 7 | 2.3 | 91 | 38 | 7 | 0.14 | 99 | 6 |
| 8 | 2.1 | 92 | 39 | 6 | 0.23 | 99 | 6 |
| 9 | 2.4 | 90 | 45 | 11 | 0.22 | 98 | 7 |
| 10 | 2.6 | 88 | 42 | 9 | 0.25 | 99 | 9 |
| 11 | 2.8 | 87 | 43 | 10 | 0.24 | 99 | 9 |
| 12 | 3.5 | 90 | 41 | 10 | 0.21 | 97 | 10 |
| 13 | 2.2 | 90 | 43 | 10 | 0.25 | 98 | 9 |
| 14 | 2.4 | 85 | 44 | 15 | 0.23 | 100 | 9 |
| 15 | 2.4 | 91 | 38 | 12 | 0.23 | 99 | 9 |
| 16 | 2.3 | 88 | 46 | 11 | 0.23 | 100 | 8 |
| 17 | 1.9 | 91 | 37 | 10 | 0.24 | 98 | 6 |
| 18 | 3.8 | 98 | 49 | 10 | 0.25 | 95 | 9 |
| 19 | 1.5 | 15 | 49 | 11 | 0.24 | 98 | 13 |
| 20 | 3.5 | 88 | 45 | 10 | 0.29 | 99 | 9 |
| 21 | 2.5 | 17 | 48 | 10 | 0.25 | 97 | 12 |
| 22 | 1.9 | 85 | 21 | 0 | 0.11 | 99 | 6 |
| 23 | 3.8 | 98 | 49 | 10 | 0.25 | 99 | 14 |
| 24 | 3.8 | 98 | 49 | 10 | 0.25 | 5 | 5 |

TABLE 3-continued

Steel sheet microstructure of hot-pressed member

| Sample No. | Standard deviation of Vickers hardness values | Thickness of Ni diffusion region (μm) | Mndif (mass %) | Tensile property TS MPa | Delayed fracture resistance | Notes |
|---|---|---|---|---|---|---|
| 1 | 30 | 10 | 0.09 | 2012 | ○ | Invention example |
| 2 | 28 | 20 | 0.10 | 2053 | ○ | Invention example |
| 3 | 34 | 20 | 0.10 | 2231 | ○ | Invention example |
| 4 | 25 | 5 | 0.08 | 1954 | ○ | Invention example |
| 5 | 24 | 18 | 0.12 | <u>1522</u> | ○ | Comparative example |
| 6 | <u>55</u> | 12 | 0.11 | 2355 | x | Comparative example |
| 7 | <u>49</u> | 14 | 0.11 | 2001 | x | Comparative example |
| 8 | <u>43</u> | 13 | <u>0.21</u> | 2011 | x | Comparative example |
| 9 | <u>51</u> | 21 | <u>0.21</u> | 2009 | x | Comparative example |
| 10 | <u>55</u> | 15 | <u>0.22</u> | 2015 | x | Comparative example |
| 11 | <u>45</u> | 20 | <u>0.22</u> | 2009 | x | Comparative example |
| 12 | <u>49</u> | 20 | <u>0.23</u> | 1982 | x | Comparative example |
| 13 | <u>56</u> | 19 | <u>0.23</u> | 1977 | x | Comparative example |
| 14 | <u>51</u> | 26 | <u>0.22</u> | 1988 | x | Comparative example |
| 15 | <u>45</u> | 21 | <u>0.21</u> | 1998 | x | Comparative example |
| 16 | <u>49</u> | 18 | <u>0.23</u> | 2011 | x | Comparative example |
| 17 | <u>48</u> | 11 | <u>0.21</u> | 2008 | x | Comparative example |
| 18 | <u>55</u> | 18 | <u>0.21</u> | 1848 | x | Comparative example |
| 19 | <u>49</u> | 19 | <u>0.23</u> | 1925 | x | Comparative example |
| 20 | <u>49</u> | 18 | <u>0.22</u> | 2001 | x | Comparative example |
| 21 | <u>48</u> | 19 | <u>0.23</u> | 2005 | x | Comparative example |
| 22 | 30 | <u>0</u> | 0.09 | 2015 | x | Comparative example |
| 23 | <u>60</u> | 13 | <u>0.25</u> | 1808 | x | Comparative example |
| 24 | <u>65</u> | 3 | <u>0.27</u> | <u>1098</u> | x | Comparative example |

The underline indicates the value is outside the range of the invention.

Referring to Table 3, in all of the hot-pressed members of Nos. 1 to 4, the tensile strength was 1780 MPa or greater, the standard deviation of Vickers hardness values was 35 or less, the Vickers hardness being measured every 200 μm on the surface of each of the hot-pressed members, the Ni diffusion region measured a thickness of 0.5 μm or greater, and the desired delayed fracture resistance was achieved. In contrast, in Nos. 5 to 7, the chemical compositions of all of the samples were outside the range according to aspects of the present invention, and as a result, one of the tensile strength, the standard deviation of Vickers hardness values of the surface, and the delayed fracture resistance was unsatisfactory.

In Nos. 8 and 9, the chemical composition was within the range according to aspects of the present invention, but the condition for the continuous casting was outside the range according to aspects of the present invention; as a result, in the cold-rolled steel sheets, although the desired microstructure was obtained, the standard deviation of Vickers hardness values was greater than 30 because of the high degree of Mn segregation; consequently, in the hot-pressed members, too, although the desired microstructure was obtained, the desired delayed fracture resistance was not achieved because of the high degree of Mn segregation.

Furthermore, in Nos. 10 to 21, the chemical composition was within the range according to aspects of the present invention, but the method for producing the cold-rolled steel sheet to be hot-pressed was outside the range according to aspects of the present invention. As a result, in some cases (Nos. 10 to 15 and Nos. 18 to 21), the desired microstructure did not exist in either the cold-rolled steel sheet to be hot-pressed or the hot-pressed member that resulted from the hot pressing, and in the other cases, a difference in hardness due to segregation of Mn occurred in the cold-rolled steel sheet to be hot-pressed, and thus, the standard deviation of Vickers hardness values of the surface was greater than 30; consequently, a difference in hardness due to segregation of Mn also existed in the member that resulted from the hot pressing, and as a result, although the desired tensile property was achieved, the delayed fracture resistance was unsatisfactory. In No. 22, the chemical composition was within the range according to aspects of the present invention, but the Ni coating layer was absent; as a result, the Ni diffusion layer was not formed during the hot pressing, and, consequently, the desired delayed fracture resistance was not achieved.

Nos. 23 and 24 were similar to Comparative Example No. 18, with a difference being that, in Nos. 23 and 24, the hot pressing was performed at a hot-pressing temperature that was outside the range according to aspects of the present invention.

In No. 23, in which the same cold-rolled steel sheet as that of No. 18 was hot-pressed at a temperature greater than 1100° C., the prior austenite grain diameter was larger than that of the hot-pressed member of No. 18, and the standard deviation of Vickers hardness values of the hot-pressed member was more unsatisfactory.

In No. 24, in which the same cold-rolled steel sheet as that of No. 18 was hot-pressed at a temperature less than the $Ac_3$ transformation temperature, the desired amount of martensite was not obtained; as a result, compared with the hot-pressed member of No. 18, the TS was degraded, and the standard deviation of Vickers hardness values of the hot-pressed member was degraded.

In both of Nos. 23 and 24, the degree of Mn segregation was degraded compared with No. 18, and, therefore, the delayed fracture resistance was also degraded.

INDUSTRIAL APPLICABILITY

Hot-pressed members according to aspects of the present invention have a tensile strength of 1780 MPa or greater, and the hot-pressed members have a standard deviation of Vickers hardness values of 35 or less and, therefore, exhibit excellent delayed fracture resistance. In instances where any of the hot-pressed members according to aspects of the present invention is used in, for example, an automotive structural member, the weight of the vehicle body is reduced, and, consequently, fuel efficiency is improved; therefore, the hot-pressed members provide very high utility for the industry.

The invention claimed is:

1. A hot-pressed member comprising:
a steel sheet; and
a surface layer disposed on a surface of the steel sheet, the steel sheet having a chemical composition containing, in mass%,
C: 0.28% or greater and less than 0.50%,
Si: 0.01% or greater and 1.5% or less,
Mn: 1.0% or greater and 2.2% or less,
P: 0.05% or less,
S: 0.005% or less,
Al: 0.01% or greater and 0.50% or less,
N: 0.01% or less,
Sb: 0.001% or greater and 0.020% or less, and
one or more selected from
  Mo: 0.005% or greater and 0.35% or less,
  Cr: 0.005% or greater and 0.35% or less,
  Nb: 0.001% or greater and 0.05% or less,
  Ti: 0.001% or greater and 0.05% or less,
  B: 0.0002% or greater and 0.0050% or less,
  Ca: 0.005% or less,
  V: 0.05% or less,
  Cu: 0.50% or less,
  Ni: 0.50% or less, and
  Sn: 0.50% or less,
with a balance being Fe and incidental impurities,
wherein, in the hot-pressed member,
the steel sheet has a microstructure in which a prior austenite average grain diameter is 8 μm or less, and martensite is present in a volume fraction of 95% or greater in a region within 30 μm of the surface of the steel sheet of the hot-pressed member,
a Ni diffusion region having a thickness of 0.5 μm or greater exists in the surface layer,
a standard deviation of Vickers hardness values of the hot-pressed member is 35 or less,
Mndif, a degree of Mn segregation in a sheet thickness direction, obtained by the following equation, is 0.20 mass% or less:

Mndif (mass%) =Mnmax (mass%)−Mnmin (mass%) ≤0.20, where

Mnmax (mass%) is a maximum value of amounts of Mn measured by EPMA line analysis in a sheet thickness direction, and
Mnmin (mass%) is a minimum value of the amounts of Mn measured by EPMA line analysis in a sheet thickness direction, and
the hot-pressed member has a tensile strength of 1780 MPa or greater, and
the hot-pressed member has satisfactory delayed fracture resistance if a bolt-tightened test piece, having a bolt secured to the hole of the nut of a welded body, upon immersion in a solution of hydrochloric acid (pH=2.0) at room temperature for 100 hours or more, displayed no fracture under either of the following loads:
(i) a load of Fs at which the nut was peeled off from the bolt-tightened test piece when an indentation-peel test was conducted in accordance with JIS B 1196: 2001, or
iii) a load of 0.7×Fs,
wherein the bolt-tightened test piece was prepared by welding an M8 bolt in a hole of 9 mm diameter in the center of a test piece measuring 50 mm×150 mm cut from the hot-pressed member, and
wherein welding was performed at welding conditions of an electrode force of 3200 N, a welding time of 5 cycles (50 Hz), a welding current of 12 kA, and a holding time of 10 cycles (50 Hz).

2. A cold-rolled steel sheet for the hot-pressed member of claim 1,
the cold-rolled steel sheet comprising a Ni-containing coating layer disposed on a surface of the steel sheet,
the steel sheet having a chemical composition containing, in mass%,
C: 0.28% or greater and less than 0.50%,
Si: 0.01% or greater and 1.5% or less,
Mn: 1.0% or greater and 2.2% or less,
P: 0.05% or less,
S: 0.005% or less,
Al: 0.01% or greater and 0.50% or less,
N: 0.01% or less,
Sb: 0.001% or greater and 0.020% or less, and
one or more selected from
  Mo: 0.005% or greater and 0.35% or less,
  Cr: 0.005% or greater and 0.35% or less,
  Nb: 0.001% or greater and 0.05% or less,
  Ti: 0.001% or greater and 0.05% or less,
  B: 0.0002% or greater and 0.0050% or less,
  Ca: 0.005% or less,
  V: 0.05% or less,
  Cu: 0.50% or less,
  Ni: 0.50% or less, and
  Sn: 0.50% or less,
with a balance being Fe and incidental impurities,
wherein
the steel sheet has a microstructure in which ferrite having an average grain aspect ratio of 2.5 or less is present in a volume fraction of 20% or greater,
a standard deviation of Vickers hardness values of the steel sheet is 30 or less,
Mndif (mass%) in a sheet thickness direction =Mnmax (mass%) - Mnmin (mass%) 0.20, where
  Mndif (mass%) is a degree of Mn segregation,
  Mnmax (mass%) is a maximum value of amounts of Mn measured by EPMA line analysis in a sheet thickness direction, and
  Mnmin (mass%) is a minimum value of the amounts of Mn measured by EPMA line analysis in a sheet thickness direction, and
the Ni-containing coating layer has a thickness of 0.5 μm or greater.

3. A method for producing the hot-pressed member according to claim 1, the method comprising:
heating the cold-rolled steel sheet for a hot-pressed member in a temperature range of an $Ac_3$ transformation temperature to 1100° C.; and
subsequently hot-pressing the steel sheet,
wherein the cold-rolled steel sheet comprises a Ni-containing coating layer disposed on a surface of the steel sheet,
the steel sheet having a chemical composition containing, in mass%, C: 0.28% or greater and less than 0.50%,
Si: 0.01% or greater and 1.5% or less,
Mn: 1.0% or greater and 2.2% or less,
P: 0.05% or less,
S: 0.005% or less,
Al: 0.01% or greater and 0.50% or less,
N: 0.01% or less,
Sb: 0.001% or greater and 0.020% or less, and
one or more selected from
    Mo: 0.005% or greater and 0.35% or less,
    Cr: 0.005% or greater and 0.35% or less,
    Nb: 0.001% or greater and 0.05% or less,
    Ti: 0.001% or greater and 0.05% or less,
    B: 0.0002% or greater and 0.0050% or less,
    Ca: 0.005% or less,
    V: 0.05% or less,
    Cu: 0.50% or less,
    Ni: 0.50% or less, and
    Sn: 0.50% or less,
with a balance being Fe and incidental impurities, wherein
    the steel sheet has a microstructure in which ferrite having an average grain aspect ratio of 2.5 or less is present in a volume fraction of 20% or greater,
    a standard deviation of Vickers hardness values of the steel sheet is 30 or less, the Ni-containing coating layer has a thickness of 0.5 μm or greater.

4. A method for producing the cold-rolled steel sheet for a hot-pressed member according to claim 2, the method comprising:

forming a continuously cast slab from molten steel having the chemical composition according to claim 2, cooling the continuously cast slab to 850° C. at an average cooling rate of 20° C/hr or greater, and subsequently cooling the continuously cast slab to 650° C. at an average cooling rate of 150° C/hr or less;

subsequently reheating the continuously cast slab and then hot-rolling the continuously cast slab under conditions in which a reduction ratio for a final pass of finish rolling is 10% or greater, a reduction ratio for a pass preceding the final pass is 12% or greater, and a finishing delivery temperature is 850 to 950° C.;

after the hot-rolling, performing primary cooling, in which a resulting steel sheet is cooled to a cooling stop temperature of 700° C. or less at a first average cooling rate of 55° C/s or greater, and after the primary cooling, performing a secondary cooling, in which the resulting steel sheet is cooled to a coiling temperature of 650° C. or less at a second average cooling rate of 5 to 50° C/s;

subsequently coiling and pickling the resulting steel sheet;

subsequently cold-rolling the resulting steel sheet;

subsequently heating the resulting steel sheet to a temperature range of 600 to 820° C. at an average heating rate of 30° C/s or less, then holding the resulting steel sheet in a soaking temperature range of 600 to 820° C. for 20 seconds or more and 30000 seconds or less, and subsequently cooling the resulting steel sheet to room temperature; and subsequently subjecting the resulting steel sheet to a coating process for applying a Ni-containing coating layer to a surface of the steel sheet.

\* \* \* \* \*

UNITED STATES PATENT AND TRADEMARK OFFICE
CERTIFICATE OF CORRECTION

| | | |
|---|---|---|
| PATENT NO. | : 11,850,821 B2 | Page 1 of 1 |
| APPLICATION NO. | : 17/425847 | |
| DATED | : December 26, 2023 | |
| INVENTOR(S) | : Katsutoshi Takashima et al. | |

It is certified that error appears in the above-identified patent and that said Letters Patent is hereby corrected as shown below:

In the Claims

In Claim 2, Column 24 Line 47: "(mass%) -Mnmin (mass%) 0.20, where" should read -- (mass%) -Mnmin (mass%) ≤0.20, where --

Signed and Sealed this
Sixteenth Day of July, 2024

Katherine Kelly Vidal
*Director of the United States Patent and Trademark Office*